United States Patent
Dropps et al.

(10) Patent No.: US 9,049,113 B1
(45) Date of Patent: Jun. 2, 2015

(54) SYSTEMS AND METHODS FOR PRIMITIVE SEQUENCE CAPTURE AND RETRANSMISSION IN A NETWORK DEVICE

(71) Applicant: QLOGIC, Corporation, Aliso Viejo, CA (US)

(72) Inventors: Frank R. Dropps, Maple Grove, MN (US); Ernest G. Kohlwey, Eagan, MN (US)

(73) Assignee: QLOGIC, Corporation, Aliso Viejo, CA (US)

(*) Notice: Subject to any disclaimer, the term of this patent is extended or adjusted under 35 U.S.C. 154(b) by 142 days.

(21) Appl. No.: 13/678,397

(22) Filed: Nov. 15, 2012

(51) Int. Cl.
*H04L 12/28* (2006.01)
*G06F 15/16* (2006.01)
*H04L 12/24* (2006.01)

(52) U.S. Cl.
CPC .................................. *H04L 41/0803* (2013.01)

(58) Field of Classification Search
USPC ........................................................ 370/254
See application file for complete search history.

(56) References Cited

U.S. PATENT DOCUMENTS

| | | | | |
|---|---|---|---|---|
| 5,564,042 A * | 10/1996 | Ventrone et al. | ............... | 713/501 |
| 6,493,802 B1 * | 12/2002 | Kessler et al. | ................ | 711/144 |
| 7,243,254 B1 * | 7/2007 | Kuroodi et al. | ............... | 713/600 |
| 7,382,790 B2 * | 6/2008 | Warren et al. | .................. | 370/401 |
| 8,005,105 B2 * | 8/2011 | Dropps et al. | .................. | 370/422 |
| 8,005,886 B2 * | 8/2011 | Jacobsen et al. | ............. | 709/200 |
| 8,705,351 B1 * | 4/2014 | McGlaughlin et al. | ........ | 370/230 |
| 2006/0072580 A1 * | 4/2006 | Dropps et al. | ............. | 370/395.7 |
| 2007/0086479 A1 * | 4/2007 | Ling et al. | ..................... | 370/463 |
| 2010/0202294 A1 * | 8/2010 | Mullendore et al. | .......... | 370/235 |

* cited by examiner

*Primary Examiner* — Edan Orgad
*Assistant Examiner* — Vanneilian Lalchinthang
(74) *Attorney, Agent, or Firm* — Klein, O'Neill & Singh, LLP

(57) ABSTRACT

Method and systems for a network device are provided. The method includes receiving configuration data having a primitive sequence comprising a first primitive and a second primitive at a first clock rate at a port of the network device; writing the configuration data into a smoothing module of the port at the first clock rate; reading the configuration data out of the smoothing module at a second clock rate; allowing a primitive to be inserted or deleted in the smoothing module to prevent smoothing module underflows or overflow; regenerating the primitive sequence at the second clock rate; and transmitting the regenerated primitive sequence to the destination port.

20 Claims, 8 Drawing Sheets

SYSTEMS AND METHODS FOR PRIMITIVE SEQUENCE CAPTURE AND RETRANSMISSION IN A NETWORK DEVICE

BACKGROUND

1. Technical Field

The present disclosure relates to networks and more particularly, to network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch where each of the aforementioned network devices also has one or more ports. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols in network devices.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine implemented method for a network device is provided. The method includes receiving configuration data having a primitive sequence comprising a first primitive and a second primitive at a first clock rate at a port of the network device. The received configuration data is destined for a destination port using a switch port bypass mode. The port includes a plurality of sub-ports that can be configured to operate independently as ports for sending and receiving information using one of a plurality of network links at a plurality of rates complying with a plurality of protocols.

The method further includes writing the configuration data into a smoothing module of the port at the first clock rate; reading the configuration data out of the smoothing module at a second clock rate; allowing a primitive to be inserted or deleted in the smoothing module to prevent smoothing module underflows or overflow; regenerating the primitive sequence at the second clock rate; and transmitting the regenerated primitive sequence to the destination port.

In another embodiment a system having a network switch element coupled to a first network device and a second network device via a plurality of network links is provided. The network switch element comprises: a processor for executing firmware code; and a first port having a plurality of sub-ports that can be configured to operate independently as ports for sending and receiving information using one of the plurality of network links at a plurality of rates complying with a plurality of protocols; and a smoothing module for storing information received by the first port.

The processor executable firmware code determines when the first port receives configuration data, including a primitive sequence having a first primitive and a second primitive from the first network device at a first clock rate and destined for the second network device in a bypass mode; writes the configuration data into the smoothing module at the first clock rate; reads the configuration data out of the smoothing module at a second clock rate; inserts or deletes a primitive in the smoothing module to prevent smoothing module underflow or overflow condition; regenerates the primitive sequence at the second clock rate when the primitive sequence is detected in the receive data; and transmits the regenerated primitive sequence to the second network device.

In yet another embodiment, a network switch element is provided. The network switch element includes a processor for executing firmware code; a first port having a plurality of sub-ports that can be configured to operate independently as ports for sending and receiving information using one of the plurality of network links at a plurality of rates complying with a plurality of protocols; and a smoothing module for the first port for receiving configuration data from a first network device and destined for a second network device while the first port operates in a bypass mode.

The processor executable firmware code: determines when the first port receives configuration data having a primitive sequence including a first primitive and a second primitive, from the first network device at a first clock rate, writes the configuration data into the smoothing module at the first clock rate; reads the configuration data out of the smoothing module at a second clock rate; allows a primitive to be inserted or deleted in the smoothing module to prevent smoothing module underflow or overflow conditions; regenerates the primitive sequence at the second clock rate when the primitive is detected; and transmits the regenerated primitive sequence to the second network device.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features with reference to the accompanying drawings of various embodiments. The illustrated embodiments are intended to illustrate, but not to limit the invention. These drawings include the following figures, in which like numerals indicate like parts.

DETAILED DESCRIPTION

Figure 1:
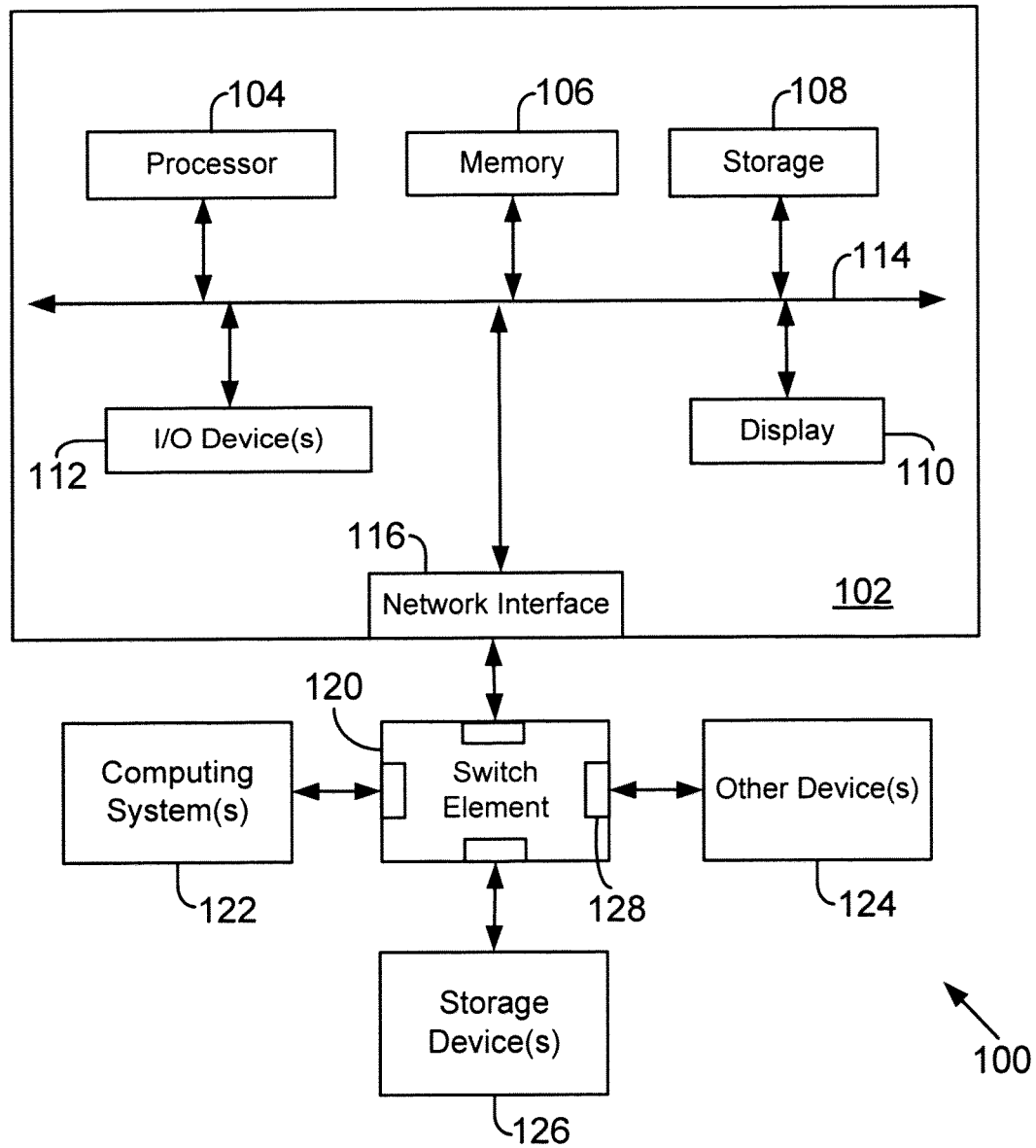
FIG. 1 is a functional block diagram of a network in connection with which the present embodiments may be used.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches (or other devices, for example, adapters) use memory buffers to temporarily hold frames that are received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame includes source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor/processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. the network interface 116 for the host system 102 and an interface (not shown) for the storage devices 126. Fabric ports are typically located in Fabric devices, such as the switch element 120. Details regarding the switch 120 are provided below.

Figure 2A:
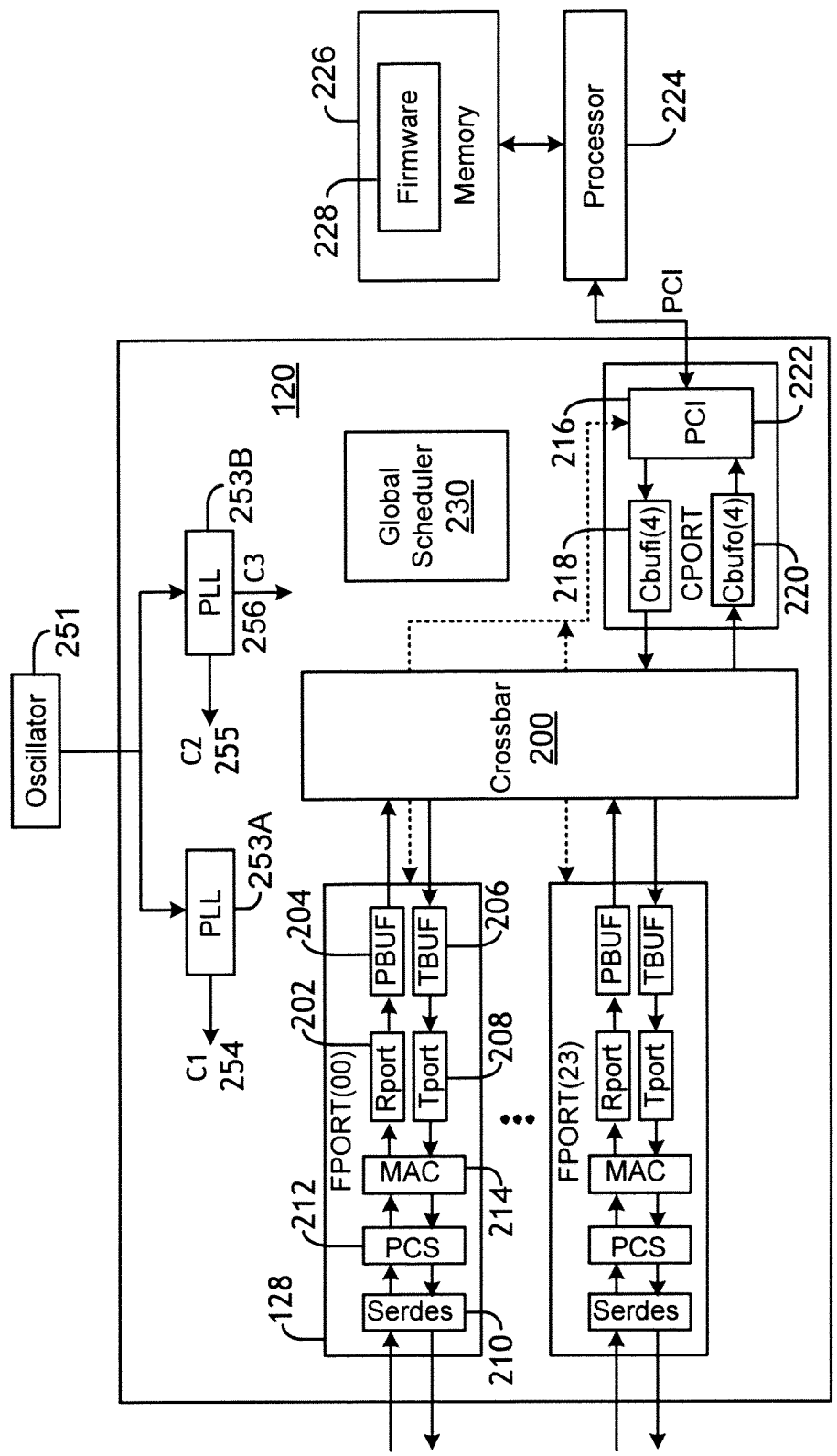
FIG. 2A is a functional block diagram of a switch element according to the present embodiments.

FIG. 2A is a high-level block diagram of the switch 120, also referred to as the switch element 120. Switch element 120 may be implemented as an application specific integrated circuit (ASIC) having a plurality of ports 128. An external oscillator 251 may be used to power a plurality of phase locked loop (PLL) circuits 253A-253B to generate a plurality of clocks, Clock1 254, Clock2 255, and Clock3 256 that are described below in detail. As an example, Clock1 254 may be 425 MHz when a port is configured to operate as a Fibre Channel port, Clock2 255 may be 312 Mhz when a port is configured to operate as an Ethernet port, and Clock3 256 may be a system clock of 850 MHz. The embodiments disclosed herein are not limited to any particular clock rate.

The ports 128 are generic (GL) ports and may include an N_Port, F_Port, FL_Port, E-Port, or any other port type. The ports 128 may be configured to operate as Fibre Channel, FCoE or Ethernet ports. In other words, depending upon what it is attached to, each GL port can function as any type of port. As an example, the ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared switch crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a control port (CPORT) 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 for processing before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT)) 208 via the crossbar 200 and a transmit buffer (TBUF) 206. The TBUF 206 is a temporary memory storage device where frames or information related to frames are staged before being transmitted. The TPORT 208 may share the MAC 214 and the PCS 212 with the RPORT 202. The SERDES 210 at TPORT 208 is used to convert parallel data into a serial stream (the SERDES 210 may also be shared with the RPORT 202).

The switch element 120 may also include the CPORT 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 stores firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to vector frames from the PBUFs 204, the TBUFs 206, and CBUFI 218 to the processor 224.

Port 128 described above may be referred to as a "base-port" that may have more than one network link available for receiving and transmitting information. Each network link allows the base-port to be configured into a plurality of independently operating sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, one double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port, or one four lane Fibre Channel port. Port 128 uses some logic that is shared among the multiple sub-ports and some logic that is dedicated to each sub-port.

Figure 2B:
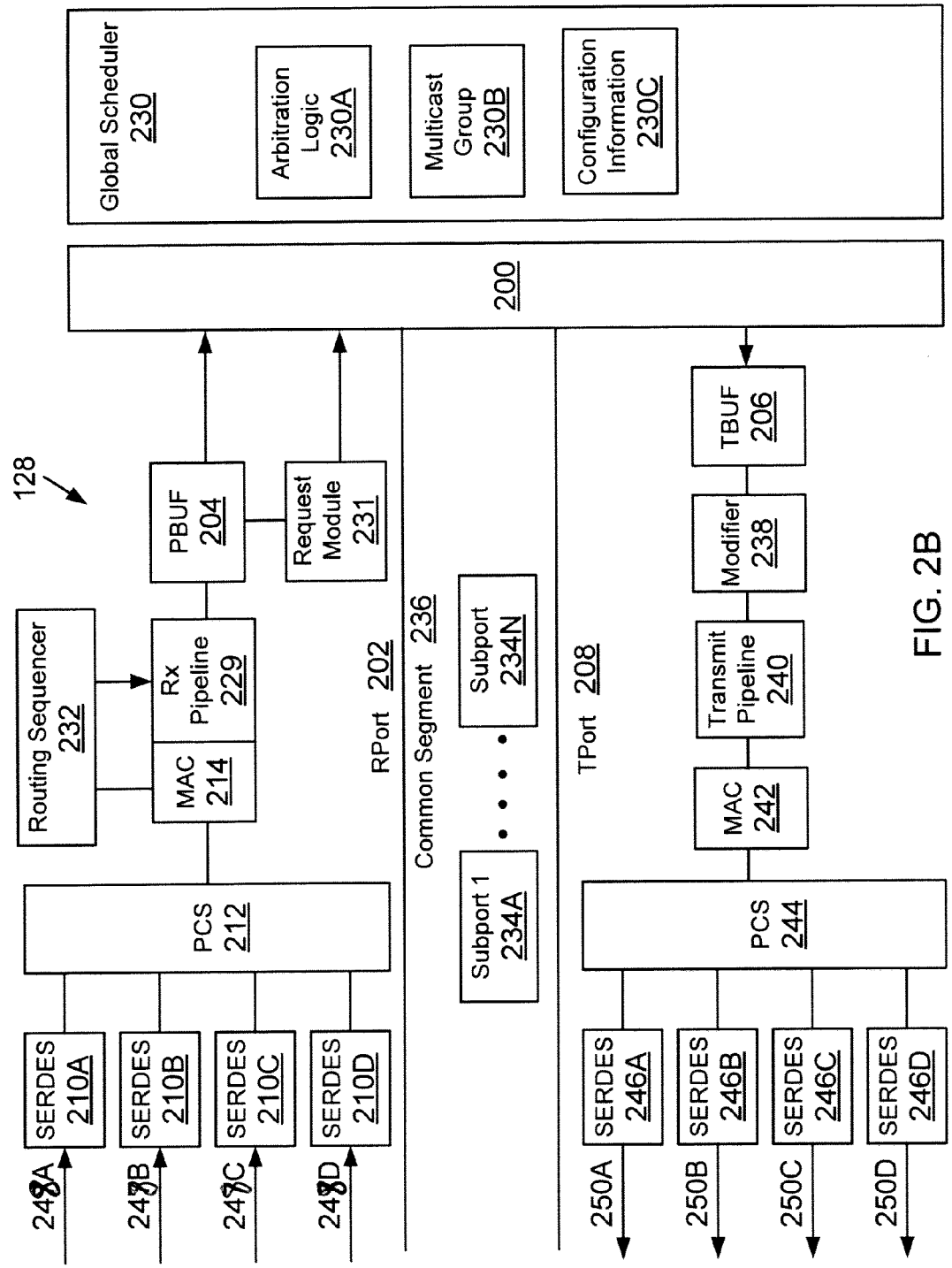
FIG. 2B is a block diagram of a port, according to one embodiment.

FIG. 2B shows an example of base-port 128 having RPORT 202, TPORT 208, and a common segment 236, according to one embodiment. RPORT 202 is used for receiving and processing frames, while TPORT 208 is used for transmitting frames. Common segment 236 is used to store configuration and status information that may be commonly used among different components of base-port 128.

In one embodiment, base-port 128 may be configured to include a plurality of sub-ports. The configuration, status, and statistics information/logic 234A-234N for each sub-port may be stored in common segment 236. The configuration logic 234A-234N may include look up tables or other data structures for storing configuration information.

RPORT 202 may include or be coupled to a plurality of network links (or lanes), for example, four independent physical network links 248A-248D, each configured to operate as a portion of an independent sub-port within base-port 128. Each network link is coupled to a SERDES 210A-210D, all of which share PCS 212 and MAC 214. The multiple lanes also share a receive pipeline (Rx pipeline) 229 that is used for pre-processing received frames before they are transferred. Both MAC 214 and receive pipelines 229 are time multiplexed so that they can be shared among the plurality of links based on how the ports are configured to operate. It is noteworthy that, in one embodiment, the receive pipeline 229 may include PCS 212 and MAC 214.

Incoming frames are received via one of the network links 248A-248D. A received frame is processed by the appropriate SERDES 210A-210D and then sent to the PCS 212. After PCS 212 processes part of the frame, part of the frame is provided to MAC 212 that is time-shared among a plurality of sub-ports. Thus, for a certain time segment (for example, a clock cycle), MAC 214 may be used by one of the sub-ports. After the MAC module 214 processes part of the frame, part of the frame is sent to receive pipeline 229 that is also time-shared. This process continues until each block has processed the complete frame.

Information regarding the frame or a copy of the frame is also provided to a routing sequencer 232 that determines a destination for the received frame. In one embodiment, a frame whose destination is processor 224 is given the highest priority, followed by a frame that is routed by a TCAM (ternary content addressable memory) or steering registers located within the routing sequencer 232. It is noteworthy that more than one routing sequencer 232 may be used for each base-port 128. Frames that are ready to be sent out are then staged at PBUF 204. PBUF 204 may have a plurality of queues (or slots) that may be referred to as receive queues (or receive buffers). The receive queues temporarily store frames, until a request to move the frame is granted.

To move frames from the receive queues, a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 includes arbitration logic 230A that performs dual stage arbitration for requests from various base-ports. Scheduler 230 also maintains a data structure at a memory labeled as multicast group 230B. The data structure stores information for identifying multicast groups that may receive multicast frames, e.g., frames that are destined to multiple destinations. Scheduler 230 stores configuration information 230C for various ports and some of that information may be used to select requests.

Frames for transmission via TPORT 208 move via TBUF 206 and a modifier 238. In one embodiment, modifier 238 may be used to insert, modify, or remove information from an outgoing frame. The modification is based on the frame type and transmit virtual queue. The time shared transmit pipeline 240 and MAC 242 are used to process outgoing frames. PCS 244, SERDES 246A-246D are used similar to PCS 212 and SERDES 210A-210D. Network links 250A-250D are similar to links 248A-248D, except links 250A-250D are used to transmit frames. Links 250A-250D may be a part of 248A-248B links for sending and receiving information. It is noteworthy that although separate PCS and MAC have been shown for RPORT 202 and TPORT 208, some of the same PCS 212 and MAC 214 logic may be shared and used in the receive and transmit paths, as seen in FIG. 2A.

Figure 3A:
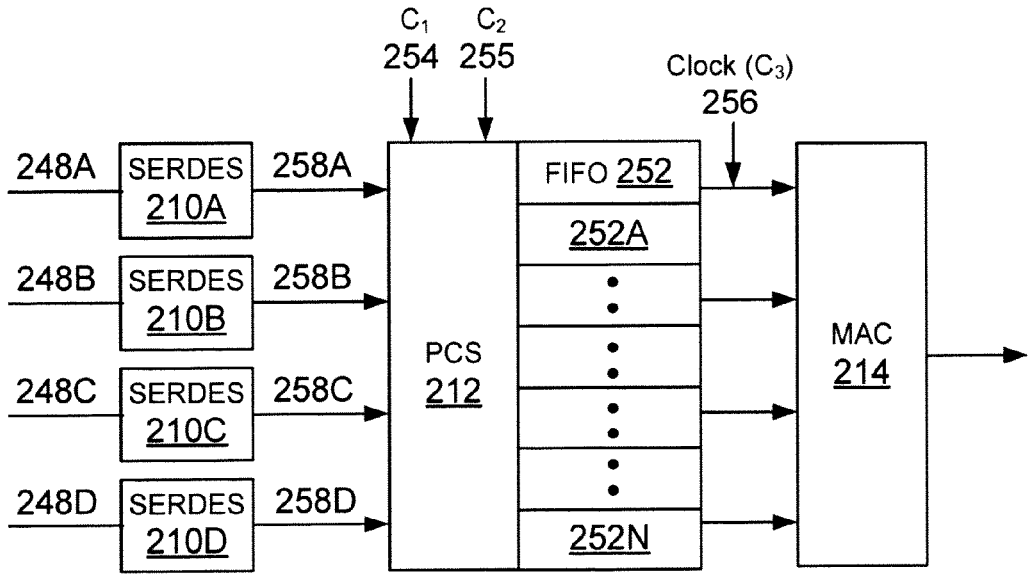
FIG. 3A is a block diagram illustrating an example of frames being received.

FIG. 3A illustrates an example of receiving frames 258A-258D at PCS 212 from SERDES 210A-210D. The frames may be received at different clock rates based on the configuration of network links 248A-248D and the associated sub-ports. As an example, frames (or data) may be received at PCS 212 and stored at Clock1 254 and/or Clock2 255, and then read out of PCS 212 at clock Clock3 256. PCS 212 includes a smoothing module, e.g., a memory storage device (shown as FIFO) 252 having a plurality of storage locations 252A-252N. The storage locations are used to stage frames or portions of a frame before the frames are read out at Clock3 256. The storage locations 252A-252N may be used to prevent overrun or under=conditions.

Figure 3B:
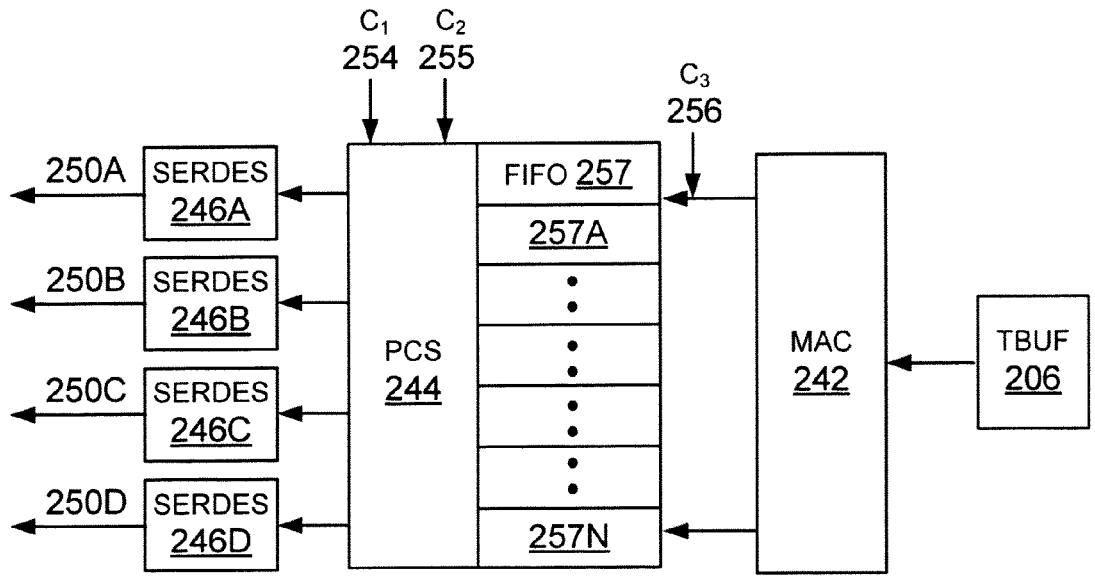
FIG. 3B is a block diagram illustrating an example of frames being transmitted.

In the transmit path, as shown in FIG. 3B, frames are received at a rate matching module, e.g., a memory storage device (shown as FIFO) 257 via TBUF 206 and shared MAC 214. In the transmit path, frames are written to FIFO 253 using the system clock 256 and read out at a clock rate Clock1 254/Clock2 255 to match the sub-port link rate. A read control logic (not shown) is used to read data from TBUF 206 to avoid any errors due to a mismatch between the system clock and the clock at which data is read out for transmission from PCS 244.

IEEE Ethernet Standard 802.3 includes Clause 37 which provides for auto-negotiation between bi-directionally linked ports (or network devices). Auto-negotiation provides a port with the capability to detect the abilities (modes of operation)

supported by a port on the other end of a bi-directional link, determine common abilities, and configure for joint operation. During IEEE Clause 37 auto-negotiation, ports of a first network device advertise their capabilities via the network link to the network device on the other end of the link (i.e., a link partner). This, in turn, allows the network devices to perform automatic configuration to achieve the best possible mode of operation over the network link. However, while Clause 37 auto-negotiation is straight forward for network devices that are directly linked, network devices that are indirectly linked (e.g., two network devices that are linked through a another network device, such as a network switch element) present challenges for Clause 37 auto-negotiation during a network switch port bypass mode, described below in detail.

The following description provides for a method, system and network device for primitive sequence capture and retransmission, where Clause 37 auto-negotiation occurs between two network devices during network switch port bypass mode, where each network device engaging in Clause 37 auto-negotiation is a network device capable of receiving/transmitting Ethernet information over the network link such as, without limitation, a server, a peripheral, an input/output subsystem, a bridge, a hub, a router, storage device(s), computing system(s) or another switch.

Figure 4:
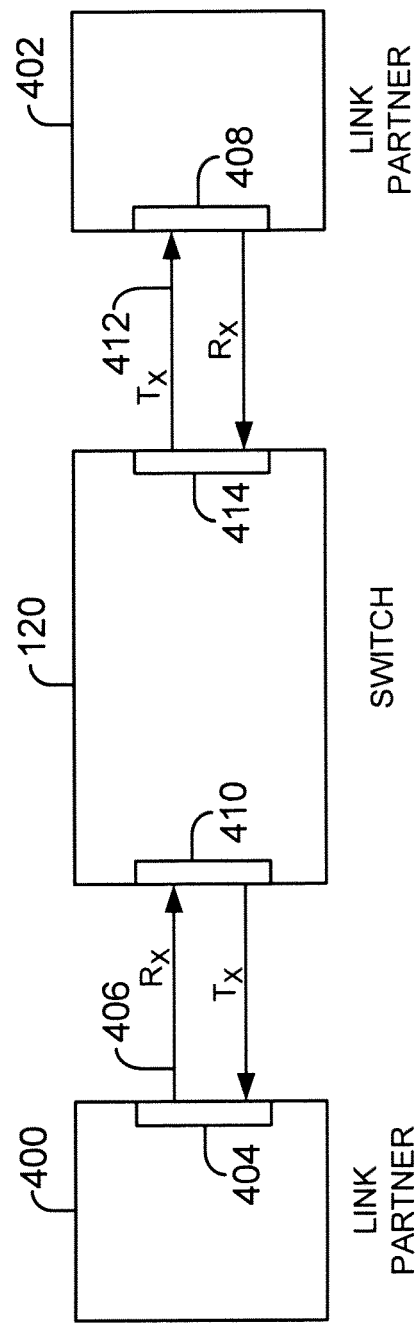
FIG. 4 is a block diagram of communication between a network switch element and two network devices, according to one embodiment.

FIG. 4 illustrates communication between a network device (e.g., a network switch element 120) and two other network devices (or link partners) 400, 402 over bi-directional links, where each link partner network device 400, 402 may be any one of, without limitation, a server, a peripheral, an input/output subsystem, a bridge, a hub, a router, storage device(s), computing system(s), or another switch. The switch 120 and network devices 400, 402 may be part of the system 100.

The goal of Clause 37 auto-negotiation is to configure a transmitting or a source Ethernet port 404 from the first network device 400 to transmit frames 406 to a receiving or destination port 408 of the second network device 402. However, the frames 406 first pass through base-port 128 (or a sub-port) in a port bypass mode before reaching the ultimate destination (i.e., the second network device 402). During the bypass mode, frames 406 from the first network device 400 arrive at a receiving port 410 of the network switch element 120, and pass through the network switch element 120 such that frames 412 depart from a transmitting port 414 of the network switch element 120 destined for the receiving or destination port 408 of the second network device 402. Likewise, Ethernet frames could be received at the switch 120 from the second network device 402 that are destined for the first network device 400.

In either situation, Clause 37 auto-negotiation is performed between the network devices 400, 402 to configure the network devices 400, 402 to transmit frames. As described above in with regard to FIGS. 3A and 3B, the frames 406 from the first network device 400 may be received at the switch 120 at a different clock rate (e.g., clock rate Clock1 254 and/or clock rate Clock2 255) than the internal or system clock rate (e.g., Clock3 256) of the switch 120. As those frames 406 start to pass through the switch 120, the clock rate of those frames 406 is adjusted in the smoothing module 252 to clock rate Clock3 256. Before the frames are transmitted from the switch 120 to the second network device 402, the clock rate of the frames is again adjusted in the rate matching module 257 from clock rate Clock3 256 to clock rate Clock1 254/Clock2 255.

As set forth in IEEE Ethernet Standard 802.3, during 1G Ethernet Clause 37 auto-negotiation, configuration data is exchanged between the network devices 400, 402. This configuration data includes a primitive sequence necessary for auto-negotiation success. This primitive sequence includes a pair of special primitives, referred to as C1 and C2 primitives or the C1/C2 primitive pair. The C1 and C2 primitives are transmitted as a pair as the C1 primitive is followed by a C2 primitive, and only by a C2 primitive, during transmission for Ethernet Clause 37 auto-negotiation. If the C1 primitive is not followed by a C2 primitive, the result is an error condition that causes Clause 37 auto-negotiation to fail. Likewise, there are no Idle primitives allowed between the C1 and C2 primitives as that would also result in an error condition. Idles are special primitives that, once detected indicate that the last state of the auto-negotiations has been reached. If the Idle primitive is detected before the last state of auto-negotiation would also result in an error condition. However, if auto-negotiation fails because the C1/C2 primitive sequences has been disrupted due to clock frequency smoothing in the network switch element 120, there is nowhere for the data to go to, and an error condition results.

During switch port bypass, the switch 120 is not involved in the auto-negotiation exchange between the network devices 400, 402 other than acting as a conduit between the network devices 400, 402. However, because clock frequency smoothing in the smoothing module 252, may need insertion or deletion of primitives to prevent smoothing FIFO underflows and overflows, the disruption of the C1/C2 primitive sequence creates an error condition. In one embodiment, the smoothing module 252 would insert or delete a full C1/C2 primitive sequence pair in such a way as to not create an error condition, as described below in detail.

Figure 5:
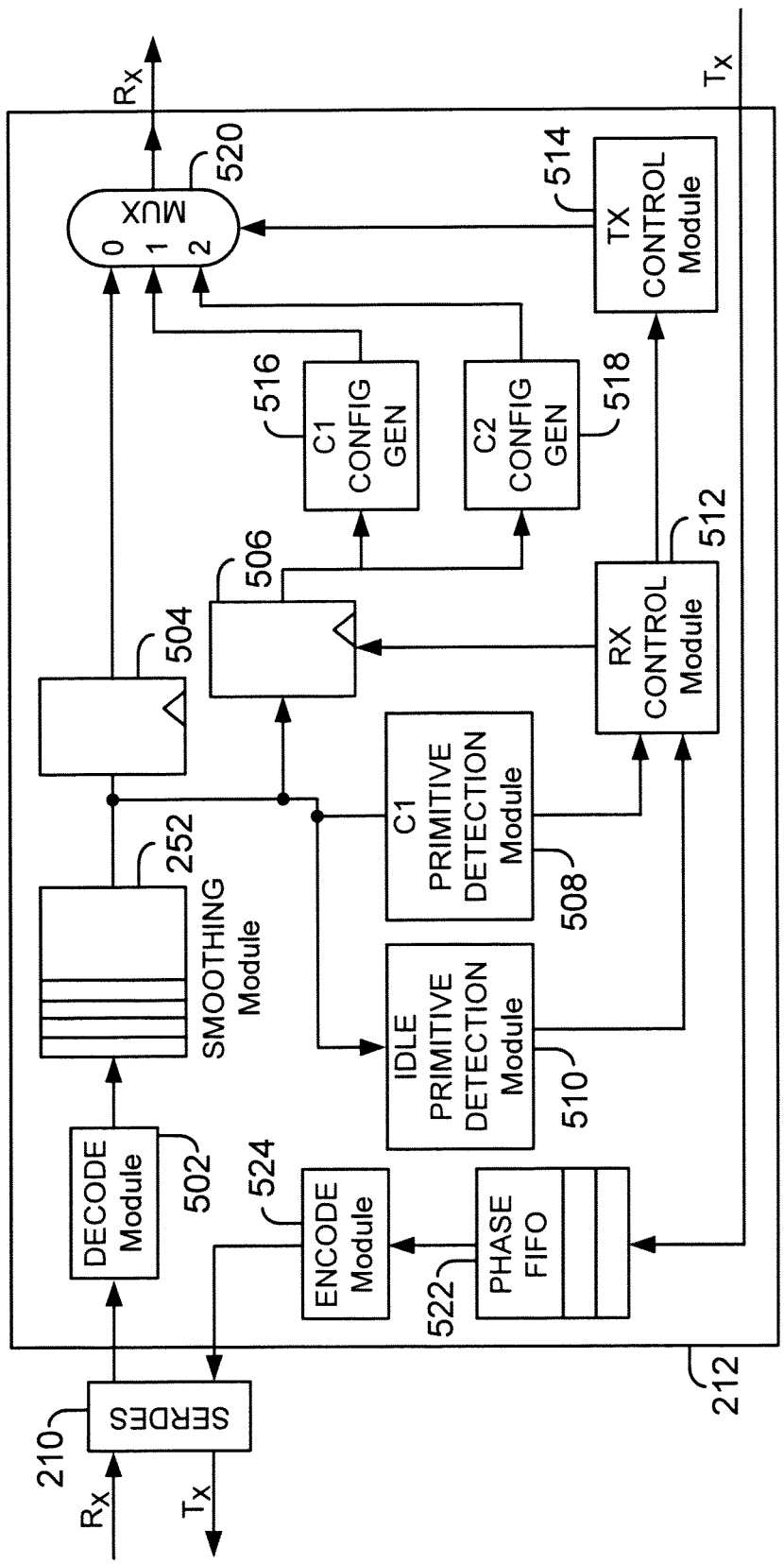
FIG. 5 is a block diagram of a portion of the network switch element, according to one embodiment.

FIG. 5 is a block diagram of a portion of the PCS 212, according to one embodiment. On the receive path, data 406 from the first network device 400 is received by the switch 120 and passes through SERDES 210 before entering PCS 212 at clock rate Clock1 254 and/or clock rate Clock2 255. The data pass through decode module 502 where the data is decoded before entering the smoothing module 252 where the clock rate of the frames 406 is adjusted to internal clock rate (i.e., clock rate Clock3 256) of the switch 120 based on how the data is read from smoothing FIFO 252.

As part of bypass mode, the incoming receive data stream is clocked into a pipeline register 504. In 1G Ethernet bypass mode, words of the raw or smooth data stream would move from the register 504 and out to the crossbar 200. However, before the data can be sent on to the second network device 402, it needs to be determined if the C1/C2 primitives sequence was detected. If the C1/C2 primitives sequence was detected, special processing is required because the smoothing module 252 may have caused a disruption of the C1/C2 primitive sequence creating an error condition during Clause 37 auto-negotiation resulting in auto-negotiation failure.

The auto-negotiation configuration data is captured in a holding register 506 when a C1 or C2 primitive is detected. In one module 508, the received data stream is examined to detect the presence of configuration data (e.g., a C1 or C2 primitive) while, in another module 510 (alternatively, both modules 508, 510 could be combined into a single module), the received data stream is examined to detect the presence of an Idle primitive. The results are passed on to Rx Control module 512 which acts accordingly, as described below with regard to FIG. 6.

The detection of a C1 primitive indicates that configuration data is being sent by the first network device 400 and the configuration data is captured by the Rx Control module 512 into the holding register 506. The detection of an Idle primitive indicates that non-configuration data is being received and auto-negotiation has reached the last state and C1/C2 primitive sequence should no longer be passed to the crossbar 200 for transmission to the second network device 402 and the PCS 212 needs to transition from sending configuration data to sending the receive data from pipeline register 504.

If configuration data is being sent, the primitive sequence is regenerated at the internal clock rate Clock3 256 by C1 Configuration Generator module 516 and C2 Configuration Generator module 518. Input from the pipeline register 504, C1 Configuration Generator module 516, and C2 Configuration Generator module 518 enters MUX 520 and then passes out of the PCS 212 to crossbar 200.

Upon determining that an Idle primitive was received, the Rx Control and Tx Control modules 512, 514 transition the PCS 212 from transmitting configuration data, including a regenerated primitive sequence (the C1/C2 primitives being transmitted in pairs), to transmitting the received data to the second network device 402. Input from the pipeline register 504 passes through MUX 520 and out of the PCS 212 to the crossbar 200.

On the transmit path, data enter the PCS 212 (or 244) from the crossbar 200 at the internal clock rate Clock3 256. The frames are received at a phase matching module, e.g., a memory storage device (shown as FIFO) 522. The phase matching module is used to exchange data between clock domains that are related in frequency, but have an unknown phase relationship There is no need to perform insert or delete data in a phase matching module as the write and read frequencies are matched. After leaving the phase matching module 522, the data pass through encode module 524 where the data is encoded prior to exiting PCS 212 and passing through SERDES 210.

Figure 6:
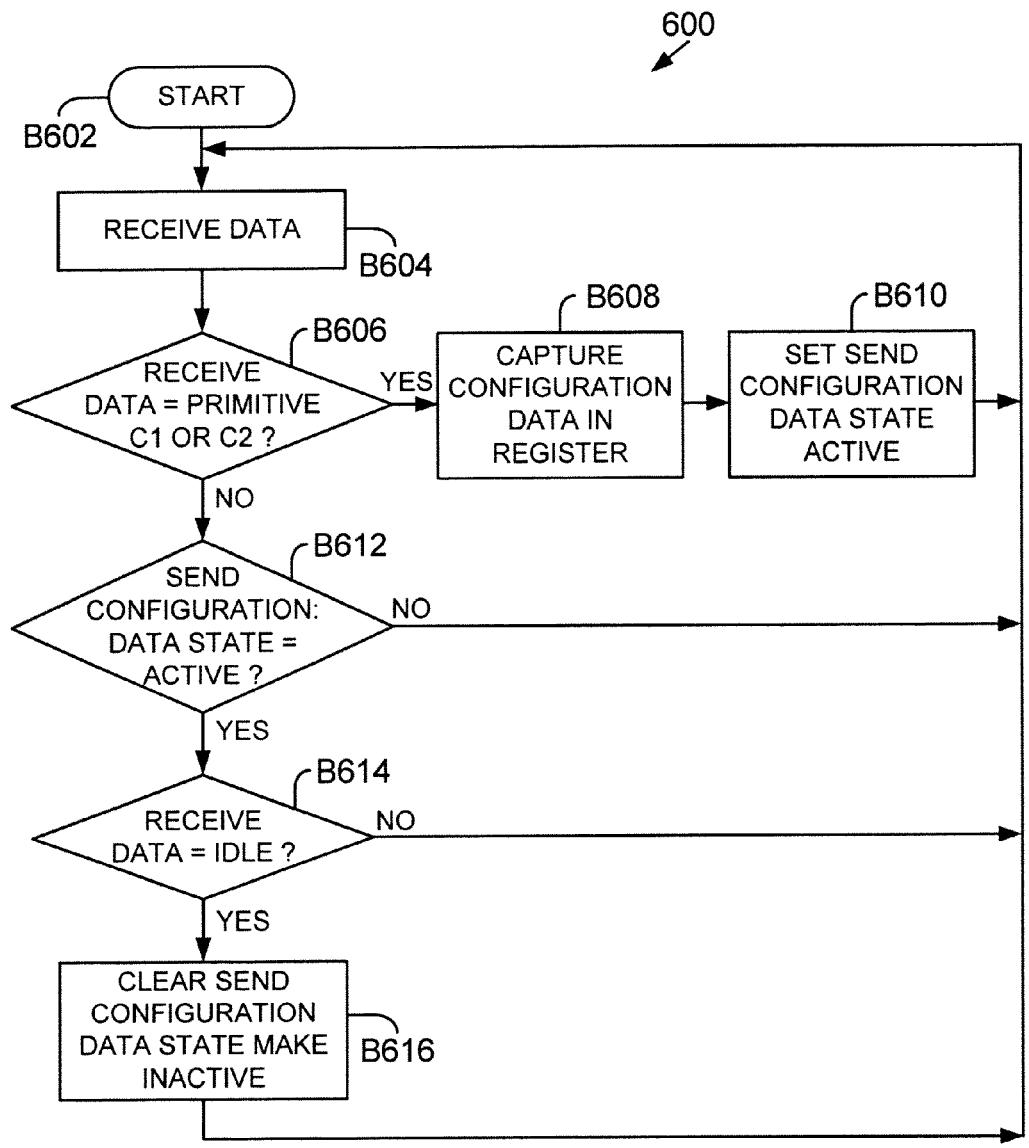
FIGS. 6-7 are process flow diagrams, according to an embodiment.

FIG. 6 shows a process 600, according to one embodiment, describing Rx Control module functions. The process begins in block B602. In block B604, data is received at the output of the smoothing module 252. The process then determines, in block B606, if the received data includes a C1 or C2 primitive. That is, the received data is examined to determine if the data includes configuration data (e.g., a primitive sequence including C1 and C2 primitives). If the received data includes a C1 or C2 primitive, then in block B608 configuration data is captured in register 506. Then in block B610, a send configuration data state "active" is set and the process loops back to block B604 where the process will continue in this manner until the process determines in block B606 that the received data does not include a C1 or C2 primitive.

If the process determines in block B606 that the received data does not include a C1 or C2 primitive, the process determines in block B612 if the send configuration data state is active. If the send configuration data state is not active, the process loops back to block B604.

However, if the send configuration data state is active, the process moves to block B614, where the process determines if the received data includes an Idle primitive. The Rx Control module 512 also communicates to Tx Control module 514 that the send configuration data state is active and the Tx Control module 514 acts accordingly, as described with respect to FIG. 7 below. If the send configuration data state is not active, the process loops back to block B604. If the process determines in block B614 that the received data includes an Idle primitive, in block B616 the process clears the send configuration data state making it inactive and then loops back to block B604. Once an Idle primitive is received, the Rx Control module 512 and Tx Control module 514 transition from transmitting a C1/C2 primitive sequence to transmitting a copy of the received data.

Figure 7:
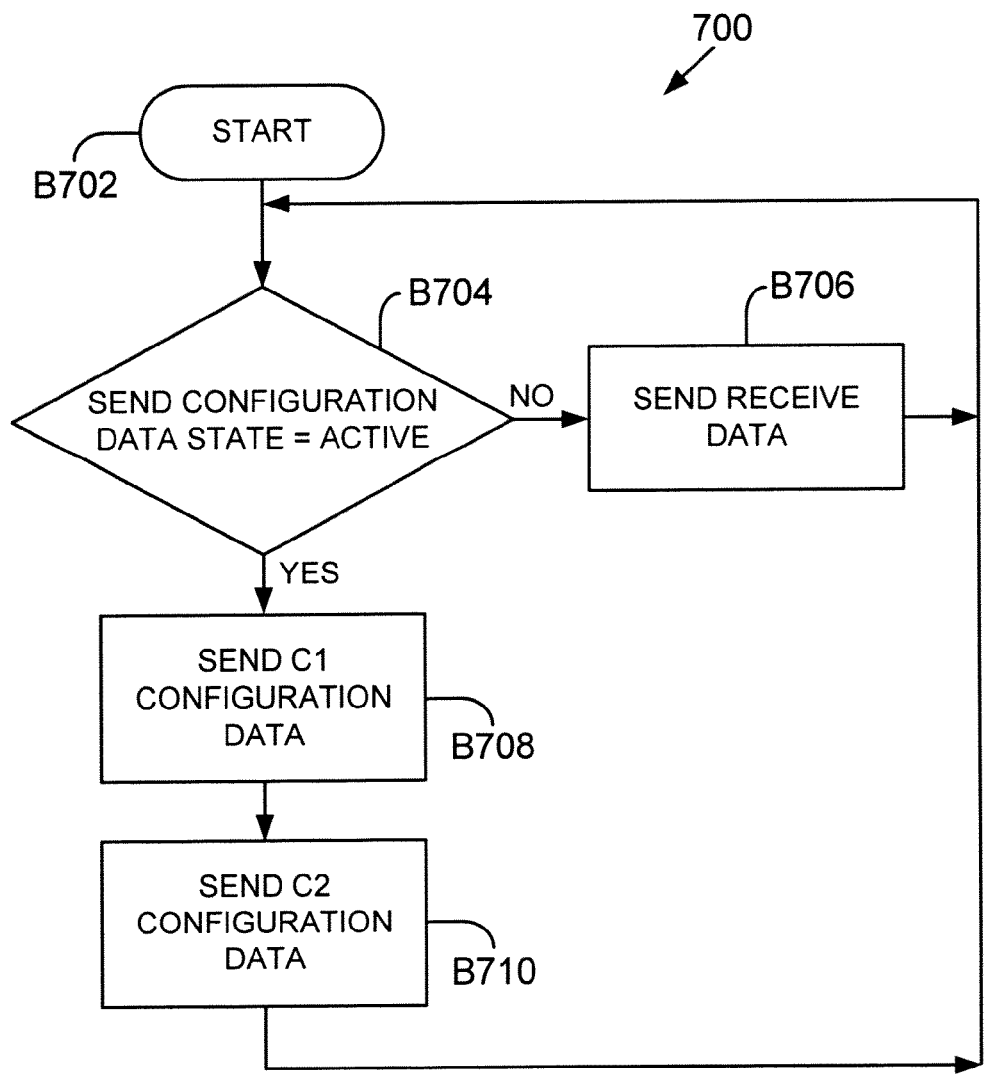

FIG. 7 shows a process 700, according to one embodiment, describing Tx Control module functions. The process begins in block B702. In block B704, the process determines if the send configuration data state is active, this having been communicated from the Rx Control module 512. If the send configuration data state is not active, the process moves to block B706 where the process sends the received data from pipeline register 504, and then loops back to block B704. If the send configuration data state is active, the process moves to block B708, where the process sends C1 configuration data, and then moves to block B710 where the process sends C2 configuration data before looping back to block B704.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the systems and techniques described above can be used in any network device including adapters and others. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine implemented method for a network device, comprising:
    receiving configuration data having a primitive sequence comprising a first primitive and a second primitive at a first clock rate at a port of the network device, wherein the received configuration data is destined for a destination port using a switch port bypass mode; and the port includes a plurality of sub-ports that can each be configured to operate as independent ports for sending and receiving information using one of a plurality of network links at a plurality of rates complying with a plurality of protocols;
    writing the configuration data into a smoothing module of the port at the first clock rate;
    reading the configuration data out of the smoothing module at a second clock rate;
    allowing a primitive to be inserted or deleted in the smoothing module to prevent smoothing module underflows or overflow;
    regenerating the primitive sequence at the second clock rate; and
    transmitting the regenerated primitive sequence to the destination port.

2. The method of claim 1, wherein receiving configuration data further comprises capturing the configuration data in a holding register of a physical coding sub-layer (PCS).

3. The method of claim 1, wherein transmitting the primitive sequence further comprises transmitting the first primitive and second primitive as a pair.

4. The method of claim 1, further comprising receiving an Idle primitive in data received at the port; and transitioning from transmitting the primitive sequence to transmitting the received data to the destination port.

5. The method of claim 1, wherein one of the plurality of sub-ports is configured to operate as an Ethernet port in the switch bypass mode.

6. The method of claim 1, wherein the second clock rate comprises an internal system clock rate of the network switch element.

7. The method of claim 1, wherein the network device is a switch element coupled to a first network device and a second network device for receiving the configuration data from the first network device and transmitting the configuration data to the second network device.

8. A system, comprising:
a network switch element coupled to a first network device and a second network device via a plurality of network links;
wherein the network switch element comprises: a processor for executing firmware code; and a first port having a plurality of sub-ports that can each be configured to operate as independent ports for sending and receiving information using one of the plurality of network links at a plurality of rates complying with a plurality of protocols; and a smoothing module for storing information received by the first port; and
wherein the processor executable firmware code determines when the first port receives configuration data, including a primitive sequence having a first primitive and a second primitive from the first network device at a first clock rate and destined for the second network device in a bypass mode; writes the configuration data into the smoothing module at the first clock rate; reads the configuration data out of the smoothing module at a second clock rate; inserts or deletes a primitive in the smoothing module to prevent smoothing module underflow or overflow condition; regenerates the primitive sequence at the second clock rate when the primitive sequence is detected in the receive data; and transmits the regenerated primitive sequence to the second network device.

9. The system of claim 8, wherein the primitive sequence is transmitted in pairs.

10. The system of claim 8, wherein the received configuration data is captured in a holding register of a physical coding sub-layer (PCS).

11. The system of claim 10, wherein the smoothing module is a part of the PCS.

12. The system of claim 8, wherein one of the plurality of sub-ports is configured to operate as an Ethernet port in the switch bypass mode.

13. The system of claim 8, wherein the second clock rate comprises an internal system clock rate of the network switch element.

14. A network switch element, comprising:
a processor for executing firmware code;
a first port having a plurality of sub-ports that can each be configured to operate as independent ports for sending and receiving information using one of the plurality of network links at a plurality of rates complying with a plurality of protocols; and
a smoothing module for the first port for receiving configuration data from a first network device and destined for a second network device while the first port operates in a bypass mode;
wherein the processor executable firmware code: determines when the first port receives configuration data having a primitive sequence including a first primitive and a second primitive, from the first network device at a first clock rate, writes the configuration data into the smoothing module at the first clock rate; reads the configuration data out of the smoothing module at a second clock rate; allows a primitive to be inserted or deleted in the smoothing module to prevent smoothing module underflow or overflow conditions; regenerates the primitive sequence at the second clock rate when the primitive is detected; and transmits the regenerated primitive sequence to the second network device.

15. The network switch element of claim 14, wherein the received configuration data is captured in a holding register.

16. The network switch element of claim 14, wherein the primitive sequence is transmitted in pairs.

17. The network switch element of claim 14, wherein the smoothing module is a part of a physical coding sub-layer (PCS) of the first port.

18. The network switch element of claim 14, wherein one of the plurality of sub-ports is configured to operate as an Ethernet port in the switch bypass mode.

19. The network switch element of claim 14, wherein the second clock rate comprises an internal system clock rate of the network switch element.

20. The network switch element of claim 14, wherein one of the sub-ports is configured to operate as a Fibre Channel port.

\* \* \* \* \*

UNITED STATES PATENT AND TRADEMARK OFFICE
CERTIFICATE OF CORRECTION

| | | |
|---|---|---|
| PATENT NO. | : 9,049,113 B1 | Page 1 of 1 |
| APPLICATION NO. | : 13/678397 | |
| DATED | : June 2, 2015 | |
| INVENTOR(S) | : Dropps et al. | |

It is certified that error appears in the above-identified patent and that said Letters Patent is hereby corrected as shown below:

In the Specification

In column 8, line 53, delete "under=conditions." and insert -- underrun conditions. --, therefor.

In column 11, line 28, delete "relationship" and insert -- relationship. --, therefor.

Signed and Sealed this
Tenth Day of November, 2015

Michelle K. Lee
*Director of the United States Patent and Trademark Office*